United States Patent [19]
Berger

[11] 3,792,325
[45] Feb. 12, 1974

[54] THYRISTOR CONTROL FOR A PLURALITY OF MOTORS

[75] Inventor: Karl W. Berger, Pittsburgh, Pa.

[73] Assignee: Westinghouse Electric Corporation, Pittsburgh, Pa.

[22] Filed: Mar. 30, 1973

[21] Appl. No.: 346,550

[52] U.S. Cl............ 318/79, 318/92, 318/345, 307/24
[51] Int. Cl. ............................................ H02p 5/12
[58] Field of Search....... 307/11, 12, 16, 17, 18, 23, 307/24, 25, 26, 29, 38, 41, 43, 51, 52, 57, 71; 318/79, 112, 92, 345

[56] References Cited
UNITED STATES PATENTS 1,336,561  4/1920  Hellmund ............................ 318/92
3,621,270  11/1971  Akamatsu ............................ 307/24

Primary Examiner—Robert K. Schaefer
Assistant Examiner—M. Ginsburg
Attorney, Agent, or Firm—J. M. Arnold

[57] ABSTRACT

A plurality of motors, such as traction motors, are provided voltage from at least one voltage source. In the thyristor control circuit, a given thyristor provides current to a load, for example at least one motor, having a current capacity no greater than the current capacity of the given thyristor.

8 Claims, 2 Drawing Figures

THYRISTOR CONTROL FOR A PLURALITY OF MOTORS

BACKGROUND OF THE INVENTION

In prior art thyristor motor control circuits, a plurality of thyristors, for example two thyristors in parallel, may provide current to at least one motor. The use of thyristors in parallel is necessitated due to the current limitations of a given thyristor. In thyristor motor control circuits that utilize parallel thyristors, it is critical that currents be properly balanced through the thyristors, since the current drawn may be greater than the current rating of a given thyristor, which may result in overload conditions.

According to the teachings of the present invention a thyristor motor control circuit is provided in which parallel thyristors are not used, and a given thyristor provides current to a load having a current capacity no greater than the current capacity of the given thyristor.

SUMMARY OF THE INVENTION

According to the teachings of the present invention there is provided a thyristor control circuit for a plurality of motors. There is at least one source of power having first and second terminals, and also included are first and second motors, each having first and second terminals. There are first and second switches, with the first switch being connected between the first terminal of the source and the first terminal of the first motor, and the second switch being connected between the second terminal of the source and the first terminal of the motor. Also included are third and fourth switches, with the third switch being connected between the first terminal of the source and the first terminal of the second motor, and the fourth switch being connected between the second terminal of the source and the first terminal of the second motor. There are means for selectively closing the first, second, third and fourth switches for applying power to the first and second motors. Further included are means for connecting the second terminal of the first and second motors to the second terminal of the source whenever the first or third switch is closed, and for connecting the second terminal of the first and second motors to the first terminal of the source whenever the second or fourth switch is closed.

DESCRIPTION OF THE PREFERRED EMBODIMENT

Figure 1:
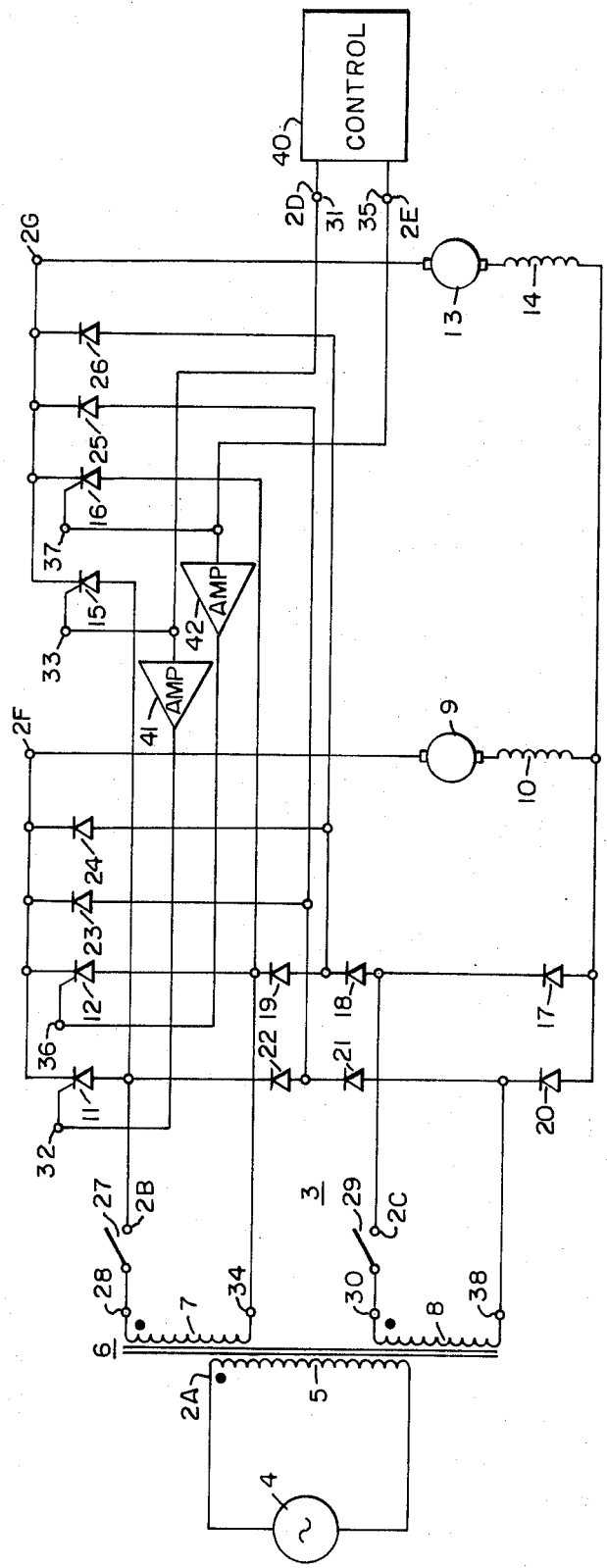
FIG. 1 is a schematic diagram representation of a thyristor motor control circuit embodying the teachings of the present invention.

FIG. 1 illustrates a thyristor motor control circuit 3 for controlling a plurality of motors such as two motors on a bimotor truck for a rapid transit or railroad vehicle. In practice, there may be n secondary windings for supplying current to m motors. Also, each motor illustrated may be comprised of two or more motors in parallel. An alternating voltage source 4 provides voltage to the primary winding 5 of a transformer 6 for inducing voltage into secondary windings 7 and 8 of the transformer. The secondary winding 7 and the secondary winding 8 function as first and second power sources, respectively, for supplying power to the thyristor motor control circuit. A first motor 9, having a field winding 10, is supplied current by thyristors 11 and 12, and a second motor 13, having a field winding 14, is supplied current by thyristors 15 and 16. The thyristors are provided control or firing pulses from a control unit 40. The control unit 40 is not shown in detail since the functioning of this type apparatus is well known in the art. A plurality of diodes such as the diodes 17-26 provide current paths for the sources in the thyristor control circuit, as well as free-wheeling paths for the motors.

The closure of a switch 27 provides a voltage from the terminal 28 of the secondary winding 7 to the thyristor motor control circuit. In practice the switch 27 may be a relay contact. The closure of a switch 29 provides voltage from the terminal 30 of the secondary winding 8 to the thyristor motor control circuit. The switch 29 in practice may also take the form of a relay contact. Assume for purposes of description that the switch 27 is initially closed and that the switch 29 is initially opened.

Figure 2:
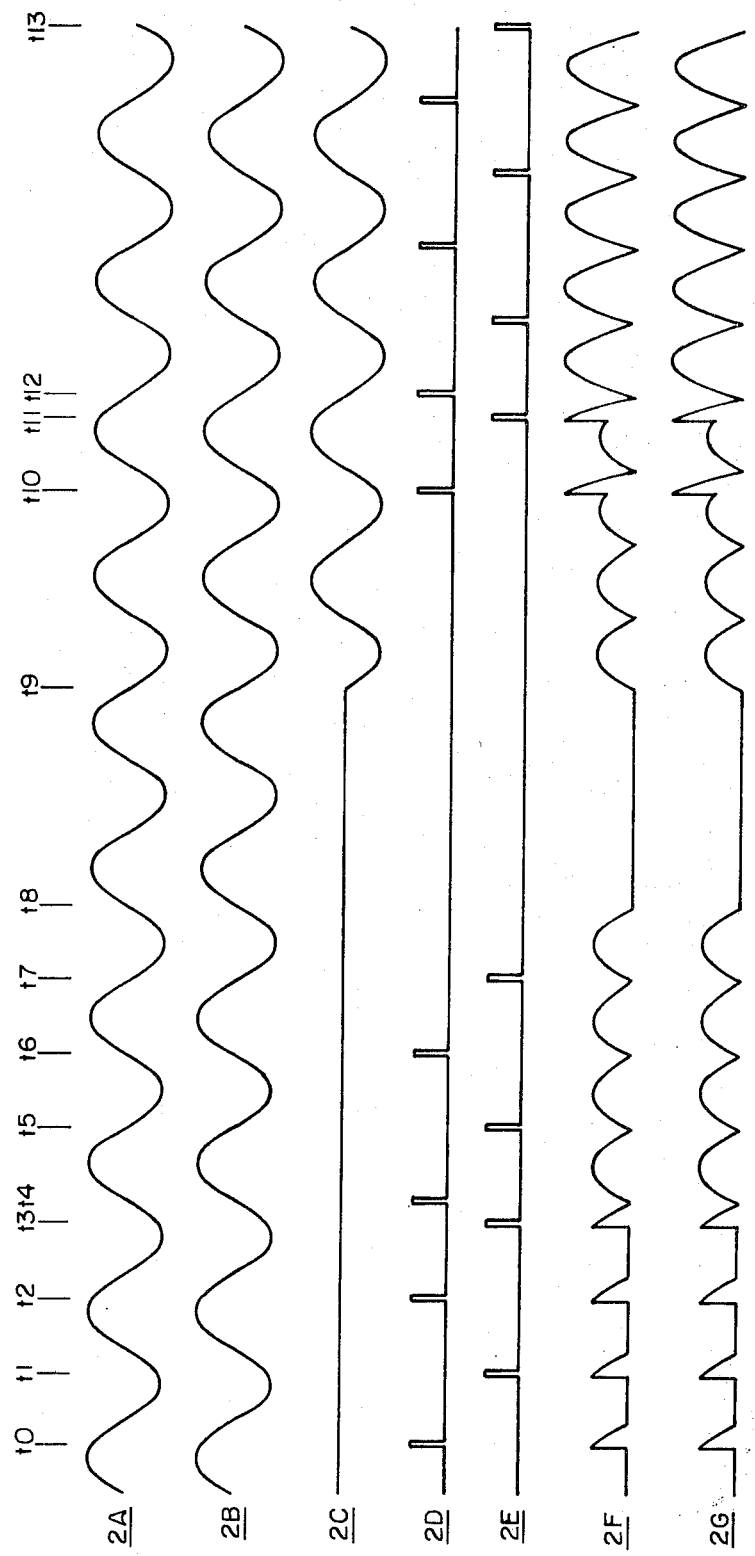
FIG. 2 is a waveshape relationship diagram illustrating certain waveshapes present in the circuit of FIG. 1.

The designations 2A through 2G found on FIG. 1 are the circuit points at which the voltage waveshapes 2A through 2G, respectively, of FIG. 2 are present in the circuit of FIG. 1. At a time t0 (see waveshape 2B) a sinusoidal signal is provided to the cathode electrodes of the thyristors 11 and 15, and a firing pulse is applied from the output terminal 31 (see waveshape 2D) of the control unit 40 to the gate electrode 32 of thyristor 11 by way of an isolation amplifier 41 and to gate electrode 33 of the thyristor 15. In response thereto the thyristors 11 and 15 become conductive for the remaining portion of the positive cycle as illustrated by the waveshapes 2F and 2G respectively. Current flows from the terminal 28, through the closed switch 27, through the conducting thyristor 11, through the armature and field winding 10 of the motor 9, through diodes 17, 18 and 19 and to the remaining terminal 34 of the secondary winding 7. Current does not flow through the diodes 20, 21 and 22 at this time, since they are reverse biased by the positive potential present at the cathode electrode of the diode 22. The diodes 23 and 24 are also reverse biased at this time due to the conduction of the thyristor 11. Likewise, diodes 25 and 26 are reverse biased due to the conduction of the thyristor 15.

Current for the second motor 13 flows from the terminal 28, through closed switch 27, through conducting thyristor 15, through the armature and field winding 14 of the motor 13, through diodes 17, 18 and 19 and back to the terminal 34. The thyristors 11 and 15 cease conduction at the end of the positive cycle which occurs shortly after the time period t0 (see waveshape 2B).

At the time t1 a firing pulse is provided from the terminal 35 of the control unit 40 to the gate electrode 36 of thyristor 12 by way of an isolation amplifier 42, and to the gate electrode 37 of the thyristor 16, which in response thereto become conductive since the terminal 34 of winding 7 is now at a positive potential. Current flows from the terminal 34 through conducting thyristor 12, through the armature and field winding 10 of the motor 9, through diodes 20, 21 and 22, through the closed switch 27 and to the terminal 28. There is no current flow through the diodes 17, 18 and 19 at this time, since they are reverse biased by the positive potential at the terminal 34. The diodes 23 and 24 are non-conductive due to the conduction of thyristor 12, and likewise the diodes 25 and 26 are non-conductive due to the conduction of the thyristor 16. Current for the second motor 13 flows from the terminal 34, through conducting thyristor 16, through the armature and field winding 14 of the motor 13 through the diode 20, diode 21 and diode 22, through the closed switch 27, and to the terminal 28. The thyristors 12 and 16 become non-conductive a short time after the time period $t1$ when the terminal 34 once again reaches a negative potential.

At the times $t2$ and $t3$ another cycle of operation similar to the times $t0$ and $t1$, respectively, occurs. It is seen that for the time period $t0$-$t3$ a limited amount of current is applied to the respective motors since the thyristor firing pulses are applied near the end of a given half cycle of operation.

If a firing pulse is applied to a thyristor at or near the beginning of a given half cycle of operation there is more current applied to a given motor. Such is the case at the time t4 when a firing pulse is applied from the terminal 31 to the gate electrodes of the thyristors 11 and 15. It is seen that this occurs at the beginning of a positive half cycle of operation. Accordingly thyristor 11 and 15 function as half-wave rectifiers for this half cycle of operation as illustrated by the waveshapes 2f and 2g respectively. At the time t5 a firing pulse is provided from the terminal 35 to the gate electrodes of the thyristors 12 and 16 making them conductive for the next half cycle of operation, and they too function as half-wave rectifiers. The same condition occurs for the next two timing periods $t7$ and $t8$, as occurred for the periods $t5$ and $t6$, respectively.

As is the case in some thyristor motor control circuits, there is a need for a second source of power, such that additional current may be applied to the respective motors. The increase in current however must be gradual such that there is not too an abrupt change in current level. At the time period $t8$ the thyristor firing pulses are interrupted for a predetermined amount of time and hence for a finite time period no voltage is applied to the motors 9 and 13. It is to be appreciated, however, that circulating currents continue to flow for a finite period. At the time period t9 the switch 29 is closed and current is supplied for the first motor 9 from the terminal 38 of the winding 8, through the diodes 21 and 23, through the armature and field winding 10 of the motor 9, through the diode 17, through the closed switch 29, and to the terminal 30. Current for the second motor 13 flows from the terminal 38, through the diode 21, through the diode 25, through the armature and field winding 14 of the motor 13, through the diode 17, through the closed switch 29 and back to the terminal 30. For the next half cycle of operation current for motor 9 flows from the terminal 30, through the closed switch 29, through the diode 18, through the diode 24, through the armature and field winding 10 of the motor 9, through the diode 20 and to the terminal 38. Current for motor 13 flows from the terminal 30, through the closed switch 29 through the diode 18, through diode 26, through the armature and field winding 14 of the motor 13, through the diode 20 and to the terminal 38. For the latter two half cycles of operation, the circuit functioned as a half-wave rectifier for each half cycle to supply current to the respective motors.

To further increase current flow through the respective motors, a firing pulse is applied from terminal 31 of the control unit 40 at a time t10 to fire the thyristors 11 and 15 such that they become conductive for the remaining portion of this half cycle of operation. It is to be remembered that the switches 27 and 29 are both closed at this time. Therefore, current is applied to the motors 9 and 13 from the source 8 for the complete half cycle of operation, and from the source 7 for the short time interval at the end of the half cycle. This is readily seen in relation to waveshapes 2F and 2G. This condition is repeated for the next half cycle of operation at the time $t11$.

At the time $t12$ the thyristors 11 and 15 are fired at the beginning of a half cycle of operation, and the motors 9 and 13 therefore are applied maximum voltage from the source 7 and maximum voltage from the source 8. This continues through the time period $t13$ as illustrated. It is seen therefore that with the addition of a second source of power that the voltage applied to the respective motors is increased to a level twice the original level of voltage, if the thyristors are fired at the beginning of each half cycle of operation.

In summary a thyristor motor control circuit for a plurality of motors has been illustrated in which a given thyristor applies current to a load, for example at least one motor, having a current capacity no greater than the current capacity of the given thyristor.

I claim as my invention:

1. In combination:
   at least one source of power having first and second terminals;
   first and second motors, each having first and second terminals;
   first and second switches, with said first switch being connected between the first terminal of said one source and the first terminal of said first motor, and said second switch being connected between the second terminal of said one source and the first terminal of said first motor;
   third and fourth switches, with said third switch being connected between the first terminal of said one source and the first terminal of said second motor, and said fourth switch being connected between the second terminal of said one source and the first terminal of said second motor;
   means for selectively closing said first, second, third and fourth switches for applying power to said first and second motors; and
   means for causing current flow from the second terminal of said first and second motors to the second terminal of said one source whenever the first or third switch is closed, and for causing current flow from the second terminal of said first and second motors to the first terminal of said one source whenever the second or fourth switch is closed.

2. The combination claimed in claim 1, including:
   a second source of power having first and second terminals and being connected in series with said second switch and said first motor, and also being connected in series with said fourth switch and said second motor.

3. The combination claimed in claim 2 including:
   a first diode having cathode and anode electrodes, with one of the electrodes being connected to the first terminal of said first motor and the remaining electrode being connected to the first terminal of said second source; and a second diode having cathode and anode electrodes, with one of the electrodes being connected to the first terminal of said first motor and the remaining electrode being connected to the second terminal of said second source.

4. The combination claimed in claim 3 including:

a third diode having cathode and anode electrodes, with one of the electrodes being connected to the first terminal of said second motor and the remaining electrode being connected to the first terminal of said second source; and a fourth diode having cathode and anode electrodes, with one of the electrodes being connected to the first terminal of said second motor and the remaining electrode being connected to the second terminal of said second source.

5. In combination:

at least one source of power having first and second terminals;

first and second motors, each having first and second terminals;

first and second thyristors, with said first thyristor being connected between the first terminal of said one source and the first terminal of said first motor, and said second thyristor being connected between the second terminal of said one source and the first terminal of said first motor;

third and fourth thyristors, with said third thyristor being connected between the first terminal of said source and the first terminal of said second motor, and said fourth thyristor being connected between the second terminal of said source and the first terminal of said second motor;

means for selectively firing said first, second, third and fourth thyristors for applying current to said first and second motors;

a first diode having cathode and anode electrodes, with one of the electrodes being connected to the second terminal of said first and second motors and including means for connecting the remaining electrode to the second terminal of said one source; and a second diode having cathode and anode electrodes, with one of the electrodes being connected to the second terminal of said first and second motors and including means for connecting the remaining electrode to the first terminal of said one source.

6. The combination claimed in claim 5 including:

means for connecting a third diode between the first terminal of said one source and the first terminal of said first motor; and means for connecting a fourth diode between the second terminal of said one source and the first terminal of said motor.

7. The combination claimed in claim 6 including:

means for connecting a fifth diode between the first terminal of said one source and the first terminal of said second motor; and means for connecting a sixth diode between the second terminal of said one source and the first terminal of said second motor.

8. The combination claimed in claim 7 including:

a second source of power having first and second terminals and being connected in series with said second thyristor and said first motor, and also being connected in series with said fourth thyristor and said second motor.

* * * * *